(12) United States Patent
Miller et al.

(10) Patent No.: US 10,373,339 B2
(45) Date of Patent: Aug. 6, 2019

(54) HYPERSPECTRAL SCENE ANALYSIS VIA STRUCTURE FROM MOTION

(71) Applicant: The United States of America, as represented by the Secretary of the Navy, Washington, DC (US)

(72) Inventors: Corey A. Miller, Alexandria, VA (US); Thomas J. Walls, Springfield, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 40 days.

(21) Appl. No.: 15/379,166

(22) Filed: Dec. 14, 2016

(65) Prior Publication Data
US 2017/0169607 A1 Jun. 15, 2017

Related U.S. Application Data

(60) Provisional application No. 62/267,026, filed on Dec. 14, 2015.

(51) Int. Cl.
| | |
|---|---|
| *G06T 7/70* | (2017.01) |
| *G06T 7/90* | (2017.01) |
| *G06T 7/246* | (2017.01) |
| *G06T 7/73* | (2017.01) |

(Continued)

(52) U.S. Cl.
CPC .............. *G06T 7/90* (2017.01); *G01J 3/00* (2013.01); *G06K 9/00637* (2013.01); *G06T 7/248* (2017.01); *G06T 7/74* (2017.01)

(58) Field of Classification Search
CPC ........ G06K 9/00637; G06T 7/248; G06T 7/74
See application file for complete search history.

(56) References Cited

U.S. PATENT DOCUMENTS

| | | | | |
|---|---|---|---|---|
| 7,593,587 | B1* | 9/2009 | Rosario | G06K 9/0063 348/208.4 |
| 9,064,308 | B2* | 6/2015 | Flanders | G06T 5/002 |
| 9,269,162 | B1* | 2/2016 | Robinson | G06T 7/11 |

(Continued)

OTHER PUBLICATIONS

Zhang et al. "Tensor Discriminative Locality Alignment for Hyperspectral Image Spectral—Spatial Feature Extraction", IEEE Transactions on Geoscience and Remote Sensing, 0196-2892, 2012.*

(Continued)

*Primary Examiner* — Qian Yang
(74) *Attorney, Agent, or Firm* — US Naval Research Laboratory; Richard F. Bis

(57) ABSTRACT

A method for determining structure from motion in hyperspectral imaging includes acquiring hyperspectral data cubes containing intensity data, the intensity data being stored in dimensions of the hyperspectral data cube including a first spatial dimension, a second spatial dimension, and a spectrum dimension; establishing a set of baseline spectral features from a data cube for tracking between data cubes; establishing a set of standard features from a data cube for tacking between data cubes; matching, between data cubes, respective baseline features and standard features; and extracting imaging device motion information based on relative positions of matched baseline and standard features.

12 Claims, 7 Drawing Sheets

(51) Int. Cl.
*G01J 3/00* (2006.01)
*G06K 9/00* (2006.01)

(56) References Cited

U.S. PATENT DOCUMENTS

| | | | | |
|---|---|---|---|---|
| 2003/0071194 A1* | 4/2003 | Mueller | ............... | G01B 11/00 250/208.1 |
| 2008/0046217 A1* | 2/2008 | Polonskiy | ............... | G01J 3/28 702/179 |
| 2016/0187199 A1* | 6/2016 | Brunk | ............... | G01J 3/2823 348/89 |

OTHER PUBLICATIONS

Tsai et al. "Feature Extraction of Hyperspectral Image Cubes Using Three-Dimensional Gray-Level Cooccurrence", IEEE Transactions on Geoscience and Remote Sensing, vol. 51, No. 6, June 2013.*

* cited by examiner (a) Industrial Building - RGB false color imagery (b) Industrial Building - Sparse (c) Industrial Building - Dense

HYPERSPECTRAL SCENE ANALYSIS VIA STRUCTURE FROM MOTION

RELATED APPLICATIONS

This application claims the benefit of U.S. Provisional Application No. 62/267,026 filed Dec. 14, 2015, which is hereby incorporated herein by reference.

FIELD OF INVENTION

The present invention relates generally to three-dimensional (3D) structure from motion (SFM) algorithms, and more particularly to building 3D reconstructions of spectral scene content using only hyperspectral data cubes as input.

BACKGROUND

Structure from motion (SFM) is a range imaging technique for estimating three-dimensional (3D) structures from two-dimensional image sequences. By leveraging a moving platform's change in perspective, structural information can be extracted from images and used to build 3D models of the scene at hand. Recent progress in hyperspectral imaging (HSI) technology, which adds a third, spectral dimension to collected imagery, has resulted in these non-traditional image sensors being integrated in a wide variety of applications including surveillance/reconnaissance, geological surveying, and structural inspection. As these sensors continue to become smaller and lighter, their integration into motion-based platforms, both aerially and on the ground, is becoming more commonplace. In such applications, it is advantageous to process the additional spectral content in an intuitive 3D environment. Conventional techniques, however, rely on the combination of HSI data with a secondary data source in order to generate the 3D content.

SUMMARY OF INVENTION

Therefore, described herein are exemplary methods and SFM algorithms to build 3D reconstructions of spectral scene content using only the hyper-spectral data cubes. Exemplary algorithms leverage the additional spectral dimension found in HSI data compared to traditional imagery to build baseline estimates for camera motion between views, and incorporate the spectral signatures of each pixel into the 3D reconstruction product, allowing for enhanced and intuitive HSI data processing. Herein is described a complete and deployable HSI SFM processing system.

According to one aspect of the invention, a method for determining structure from motion in hyperspectral imaging, the method including the steps of: acquiring a sequence of hyperspectral data cubes taken by an imaging device, each hyperspectral data cube containing intensity data, the intensity data being stored in dimensions of the hyperspectral data cube including a first spatial dimension, a second spatial dimension, and a spectrum dimension; establishing a set of baseline spectral features from a data cube for tracking between data cubes; establishing a set of standard features from a data cube for tacking between data cubes; matching, between data cubes, respective baseline features and standard features; and extracting imaging device motion information based on relative positions of matched baseline and standard features.

Optionally, the step of establishing a set of baseline features includes detecting anomalies in the intensity data by measuring spectral differences between spatial regions of the data cube.

Optionally, detecting anomalies in the intensity data includes performing a Reed-Xiaoli Detector (RXD) algorithm on each data cube, and comparing the output of the RXD algorithm to a predetermined threshold to select a subset of most spectrally unique points in the data cube.

Optionally, the step of establishing a set of standard features includes flattening each data cube into a false-color RGB representation; performing on the false-color RGB representation and on three monochromatic images from the data cube a feature detection and extraction routine to determine the set of standard features.

Optionally, flattening each data cube includes selecting three individual bands to represent each of three RGB channels.

Optionally, flattening each data cube includes averaging over a range of bands to generate each of three RGB channels.

Optionally, the step of matching includes using both a brute-force feature matcher routine with additional spectral verification, providing a two-factor verification that reduces mismatched features between data cubes.

Optionally, the step of matching includes matching baseline spectral features using a nearest-neighbor routine and computing spectral similarity of the baseline features via a cosine similarity measure.

Optionally, the method includes building a set of feature tracks that each follow a respective baseline feature across several data cubes in the sequence of data cubes.

Optionally, the step of extracting imaging device motion includes relating motion of the feature tracks across data cubes to motion of the imaging device.

Optionally, the method includes determining positions of respective baseline and standard features relative to the imaging device based on triangulation of imaging device motion.

Optionally, the method includes determining a baseline pair of data cubes by stepping through each pair of data cubes and determining which pair has the highest percentage of accurately-projected features.

Optionally, the step of determining includes measuring accuracy based on percentage of points with positive z-axis projections relative to a focal plane of the imaging device combined with average error of projected features as the projected features are reprojected back onto the data cubes.

Optionally, the method includes determining positions of respective baseline and standard features relative to the imaging device based on triangulation of imaging device motion between the baseline pair of data cubes.

Optionally, the method includes iteratively building a 3D reconstruction based on the determined positions by adding data cubes to the baseline pair of data cubes.

The foregoing and other features of the invention are hereinafter described in greater detail with reference to the accompanying drawings.

DETAILED DESCRIPTION

Figure 1:
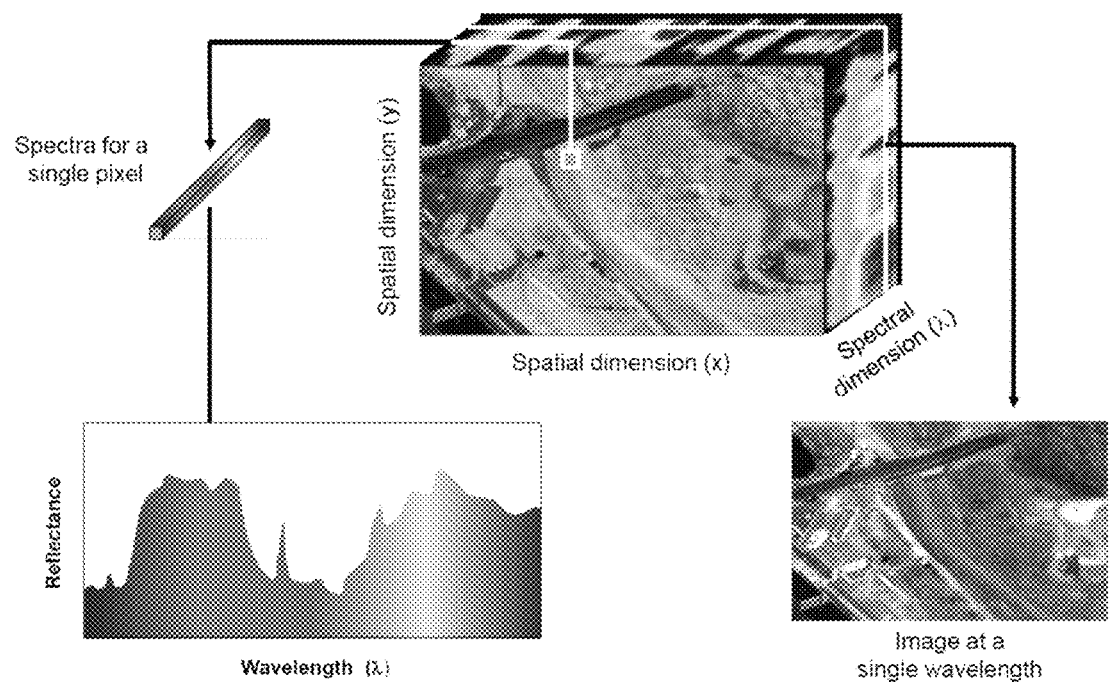
FIG. 1 shows a visual representation of a hyperspectral data cube having two spatial dimensions and one spectral dimension.

Hyperspectral sensors work by collecting densely sampled spectral information for each pixel in an image, producing a three-dimensional (x, y, $\lambda$) data cube as output, as illustrated in FIG. 1. Compared to visible cameras which only record data at red, blue, and green wavelengths, hyperspectral sensors typically capture dozens if not hundreds of individual wavelengths in the visible and non-visible spectrum. This collection allows for the pixel-level detection of anomalous spectra, known target spectra, and common elemental spectral signatures in the scene of interest. For purposes herein, the term hyperspectral imaging device is taken to mean an imaging device capable of separately capturing 4 or more frequencies or frequency bands. It is preferable that such an imaging device captures 10 or more such frequency channels, and it is even more preferable that such an imaging device captures 100 or more such frequency channels.

Hyperspectral scanners typically use either a spatial or a spectral scanning technique to generate the third dimension of the data cube. The hardware described herein is of the former variety for convenience sake, however the latter may also be used. The spatial hyperspectral scanner utilizes a two-dimensional focal-plane array that is representative of a full slit spectrum (x, $\lambda$), and the third dimension (y) is manually generated through a line-scanning motion. The exemplary sensor used herein for illustration purposes contains a 190-band short-wave infrared focal plane, housed in a fully-stabilized ball gimbal designed to be used for aerially-based, cued operation at long standoff distances. As the second spatial dimension is manually introduced through mechanical motion, high-fidelity stabilization is utilized in producing spatially-accurate imagery.

The conventional structure from motion (SFM) processing method aims to estimate three-dimensional structure from imagery collected along an axis of motion. Conventionally, the method consists of four steps: feature extraction, feature matching, triangulation, and bundle adjustment/optimization. SFM algorithms were originally developed under the assumption of using standard 2D panchromatic imagery, so we have introduced variations in several of the algorithms in order to incorporate and leverage the spectral content within HSI data.

Figure 2:
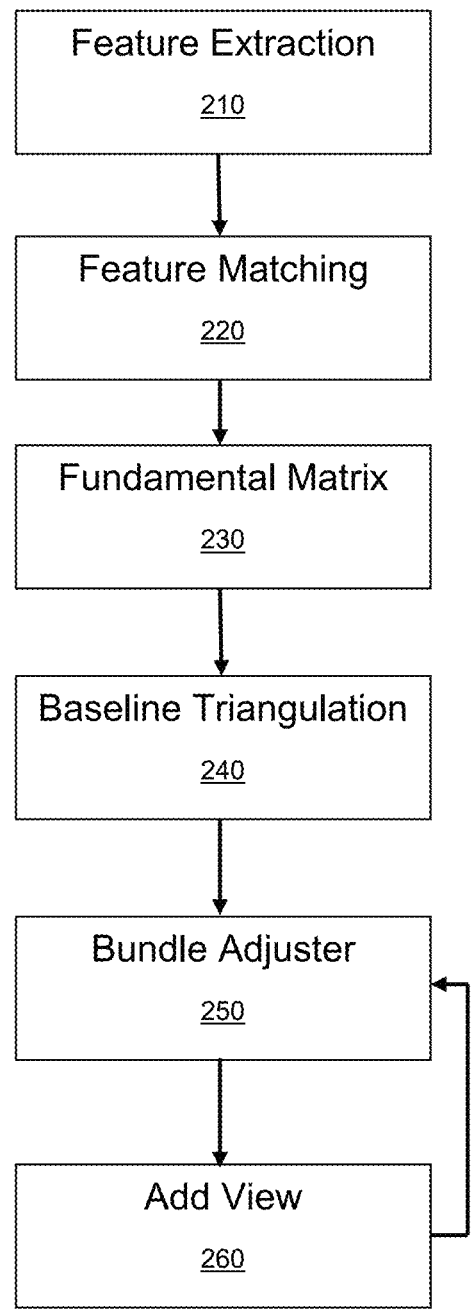
FIG. 2 shows a flowchart illustrating an exemplary method for building 3D reconstructions of spectral scene content using only hyper-spectral data cubes.

Referring now to FIG. 2, the first step 210 in an exemplary method is to extract features. An exemplary method particularly uses the Reed-Xiaoli Detector (RXD) algorithm on each data cube, an anomaly detection routine that measures the spectral differences between spatial regions of the image. By detecting subtle variations in the spectra across the image, a set of baseline spectral features are established to reliably track between all images. Next, the raw output values of the RXD algorithm are compared to a threshold to identify only those points which are the most unique within each image. The full spectrum of these RXD anomaly points are extracted and used as their descriptor vectors in the latter matching step.

In order to leverage conventional SFM feature detector algorithms, an exemplary method may flatten each HSI data cube into a false-color RGB representation. Next, three individual bands may be selected and used to represent each of the three RGB channels ($\lambda$=1043 nm, 1230 nm, and 1577 nm, e.g.). It is noted that the selection is specific to the sensor used and should be adjusted appropriately for other devices and/or materials. Additionally, for example, an average over a range of bands could be used to generate the RGB channels as opposed to single band selection. This false-color image, along with monochromatic images from each of the three bands individually, may be run through one or more conventional feature detection and extraction routines. The output of this step is a set of feature points and their respective descriptor vectors for each data cube in the set.

As shown in block 220, once a set of RXD and standard feature points are determined, they are matched between views to generate a basis for extracting the motion of the imaging device. Conventional (e.g., brute-force) feature matcher routines common to SFM may be combined with additional spectral verification in an exemplary pipeline, providing a two-factor verification that reduces mismatched features between views that can easily skew model estimation in later steps. An exemplary method may begin with the RXD features first, provided there are enough that have been reliably identified and are common to several views. Their feature descriptors may be matched using a nearest-neighbor routine and their spectral similarity may be computed via a cosine similarity measure. The cosine similarity between spectrum $S^v_i$ and $S^w_i$ of points $x^v_i$ and $x^w_i$ in match i and cameras v, w is defined according to $$\text{similarity}_i = \frac{\sum_\lambda S^v_i \times S^w_i}{\sqrt{\sum_\lambda (S^v_i)^2} \times \sqrt{\sum_\lambda (S^w_i)^2}}, \quad (1)$$

where similarity values range from −1, meaning exactly opposite, to +1, meaning exactly the same, with a value of 0 indicating independence. Once confident that the same real-world point is being matched between views, the matches are used to build a set of feature tracks that follow a given point across several views in the data set. That is, each real-world point of interest corresponds to a single feature track that contains all of the image locations of that point as the sensor passes over it. Once all the RXD feature tracks have been established, the matching routine is repeated with the standard RGB and single-band imagery feature points, extending the feature track set.

Moving to block 230, once the set of feature tracks is built, the relationship between the motion of the feature tracks across views and the respective motion of the camera is determined. In this analysis, no assumptions need be made about the camera's intrinsic parameters (focal length ($f_x$, $f_y$), principal point ($p_x$, $p_y$), and skew coefficient ($\gamma$), and therefore we can only relate camera positions up to a projective transformation via the fundamental matrix F constraint $$x'^v F_{v,w} x'^w = 0, \qquad (2)$$

for pixel x and a pair of cameras, v, w∈1, . . . , N out of N total camera views. The fundamental matrix is first computed between all possible pairs of camera views via a RANSAC routine using only the baseline set of RXD feature tracks. By providing a baseline estimate for the camera's intrinsic parameters, we can transform the fundamental matrix to its essential matrix equivalent, which is a metric relation between scenes. Our baseline estimate for these parameters only needs to be sufficiently accurate to extract a baseline camera pose from the feature tracks, as these values will be included in our bundle adjustment step and will therefore be optimized as the reconstruction builds itself. These parameters are represented by a camera calibration matrix (K) which relates the fundamental matrix to the calibrated essential matrix by $$E_{v,w} = K^t F_{v,w} K, \qquad (3)$$

where $^t$ indicates matrix transpose. We can then extract estimated rotation (R) and translation (T) extrinsic camera parameters from our estimated essential matrix. We take the singular value decomposition of E and extract R and T by defining matrix W such that $$E = USV^t \qquad (4)$$

$$T = VWSV^t \qquad (5)$$

$$R = UW^{-1}V^t, \qquad (6)$$

where the subscripts v, w are withheld for simplicity.

Moving now to block 240, determining the extrinsic rotation and translation camera parameters between views allows us to triangulate the coordinates of the real-world points associated with each of the respective feature tracks. The image point $x^j_i$, which is the $i^{th}$ point when viewed from camera j∈1, . . . , N, can be related to its 3D world coordinate point $X_i$ according to $$x^j_i \propto K_j [R_j | T_j] X_i. \qquad (7)$$

Exemplary algorithms step through each pair of cameras and determine which has the highest percentage of accurately-projected feature points. We measure accuracy here through the percent of points with positive z-axis projections relative to the camera plane (i.e. in front of the camera) combined with the average error of the 3D points as they are reprojected back onto the various camera planes. Once a baseline camera pair has been established with their corresponding 3D points, the initial bundle adjustment (BA) routine 250 is run to optimize the triangulation and initial camera parameters.

The 3D reconstruction is then iteratively built by adding camera views 260 to the existing reconstruction. For each additional camera, feature tracks that span into the established 3D space are used to compute the camera's extrinsic camera motion through an iterative 3D-2D perspective-n-point (PnP) RANSAC routine based on Levenberg-Marquardt optimization. As this system builds upon itself, the BA routine is called after each update to the 3D space. The resulting 3D point cloud space is a sparse representation of the global scene being imaged.

Exemplary methods offer a user a continuously-updated 3D view of the scene. By processing the results in 3D space, the user has a highly intuitive method of understanding and manipulating the scene and pixels of interest as determined by additional processing routines. Additional HSI data cubes can be added to the existing reconstruction as they are collected, allowing for the user's scene context to remain unchanged even though they are on moving platforms. Additionally, exemplary methods allow for rapid color-mapping of the 3D scene, which allows the user to display individual spectral band intensities, three-band RGB color mappings, anomaly/target detection color results, and even contextual color maps like a height map with relative ease.

Hereinafter is an exemplary demonstration of the output of an exemplary full HSI SFM method. The testing data set is composed of 26 individual HSI data cubes collected aerially as the HSI system completed a full orbit of an industrial complex at a large standoff distance. Each data cube is 1280 pixels×966 pixels×190 bands in dimension and has had atmospheric corrections applied. It should be noted that while the discussion within this paper relates to aerially-based data, these techniques and methodologies extend to any data set that contains a changing perspective that fits the projective geometry requirements.

Figure 3:
FIG. 3 shows a grayscale version of a false-color RGB image of an industrial complex. Three individual wavelengths from a data cube, $\lambda$=1043 nm, 1230 nm, and 1577 nm, are mapped to the RGB channels.
Figure 4:
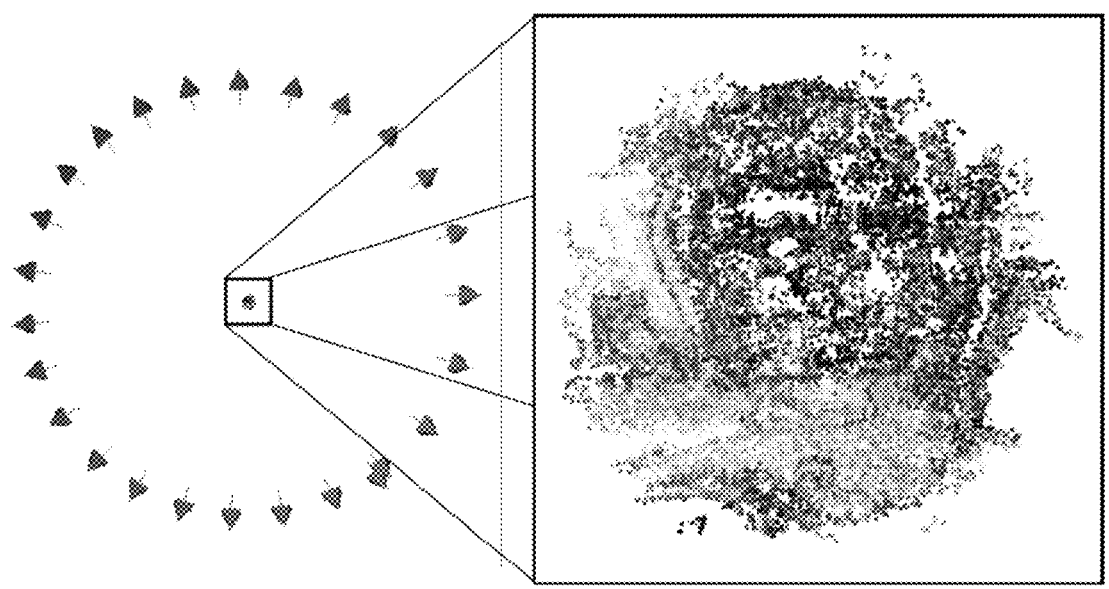
FIG. 4 shows a top-down view of the 3D reconstruction with image-extracted camera positions circling the 3D point cloud. Inset is a close-up of the point cloud.

An example portion of the industrial complex being imaged in this example can be seen in FIG. 3. The 26 HSI data cubes that make up the exemplary data set generated 86,958 feature tracks when processed in an exemplary HSI SFM pipeline, or just over 3,300 per camera view. Of these, 80,902 were determined to triangulate accurately and therefore make up the resulting 3D point cloud which can be seen in FIG. 4.

As hyperspectral imaging becomes more commonplace, analysis techniques will be developed in order to exploit the additional spectral content. The benefit of generating a 3D representation of a scene using hyperspectral data is the wealth of intuitive post-processing techniques that can be utilized. From the generation of digital elevation maps to match filtering visualization tools, performing scene analysis in a 3D environment provides the operator with an intuitive understanding of location and situational awareness that is lost in standard 2D processing. We provide several examples of this capability here.

Figure 5:
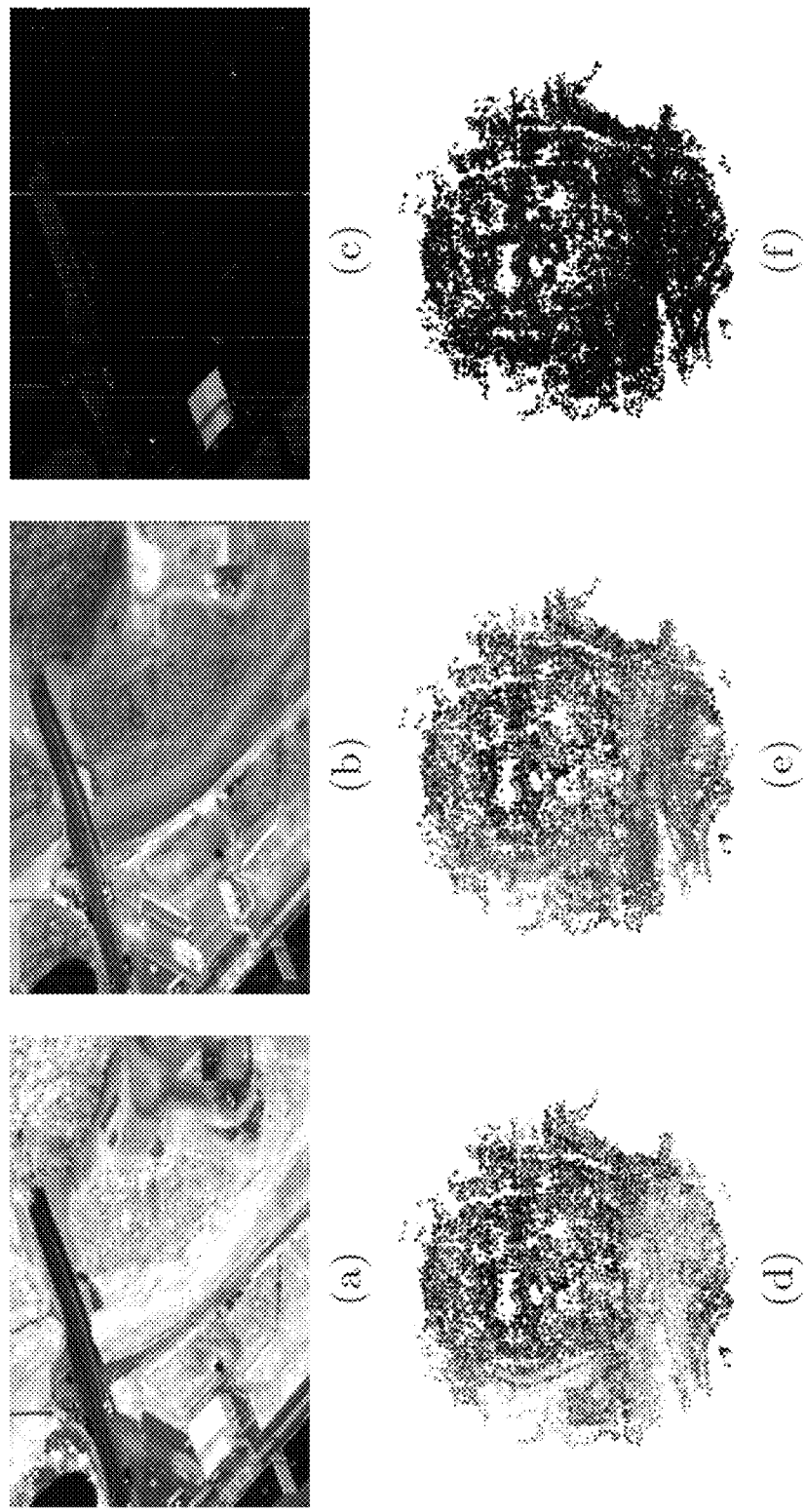
FIG. 5 shows single-band imagery (top) and 3D point cloud overlaid with the single-band data (bottom) for $\lambda_1$=1230 nm [(a), (d)], $\lambda_1$=1577 nm, [(b), (e)], as well as RX anomaly results where white indicates higher anomalous value [(c), (f)]

False-color representation can be painted onto the sparse point cloud in any manner in which the user desires. Exemplary methods select three specific bands early in the processing to generate a single false-color representation of each HSI data cube, and these RGB values automatically get pushed onto the 3D space as can be seen in FIG. 5. It is trivial to paint the scene with alternate spectral content, which provides a scene-wide visualization of spectral variations across all views simultaneously. Results from the RX anomaly algorithm can also be viewed in the 3D space, giving localization awareness of spectral irregularities relative to the global view.

A main focus of hyperspectral imaging exploitation is imaging spectroscopy, which is the identification of materials based on their absorption and reflection characteristics. Numerous algorithms have been developed for the detection of targets with known spectral signatures in unknown or unstructured backgrounds. The output of these algorithms is often some measure of target abundance relative to the sensor's local field of view. Detection values that meet the identification threshold can be localized in the global coordinate frame and viewed as an overlay in the 3D space relative to the entire global scene. Because the 3D space builds upon itself as additional data is collected, this 3D representation allows the operator to keep awareness of all identified targets simultaneously, regardless of their presence in the current field of view or not.

Figure 6:
FIG. 6 shows (a) raw HSI image of a building in an industrial complex, (b) sparse representation of the building generated as output from the SFM algorithms, (c) dense reconstruction applied locally to this building reveals 3D features found in the original image.
Figure 6:
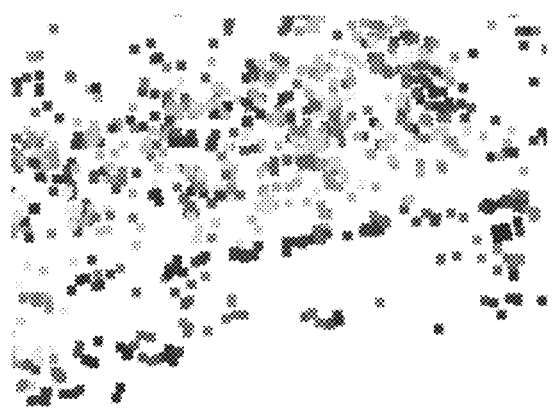
Figure 6:
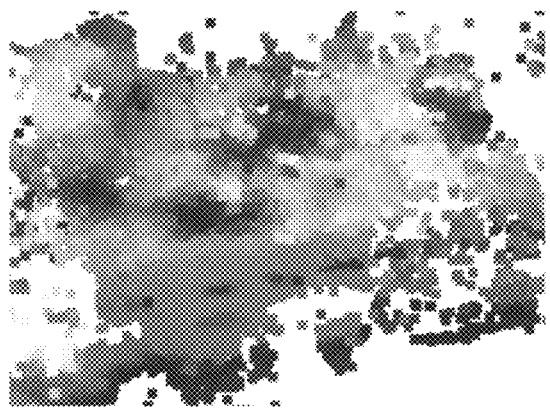

As previously discussed, the default output of the 3D SFM algorithms is a sparse point cloud of feature points matched between scenes. Dense 3D reconstructions require additional processing, and can be calculated once the user has identified specific areas of interest within the global scene. We now demonstrate this feature within our interface, where the only user interaction is to highlight a region of the 3D space that requires additional detail. Algorithms are then automatically run which utilize optical flow techniques to match the highlighted subset of the global scene on an individual pixel level. These matches are triangulated using the previously calculated camera positions, and the dense points are pushed into the 3D scene. All of the previously discussed analysis capabilities are still available to the user on the dense points, and can be exploited similarly. An example of this sparse-to-dense transition can be seen in FIG. 6.

Figure 7:
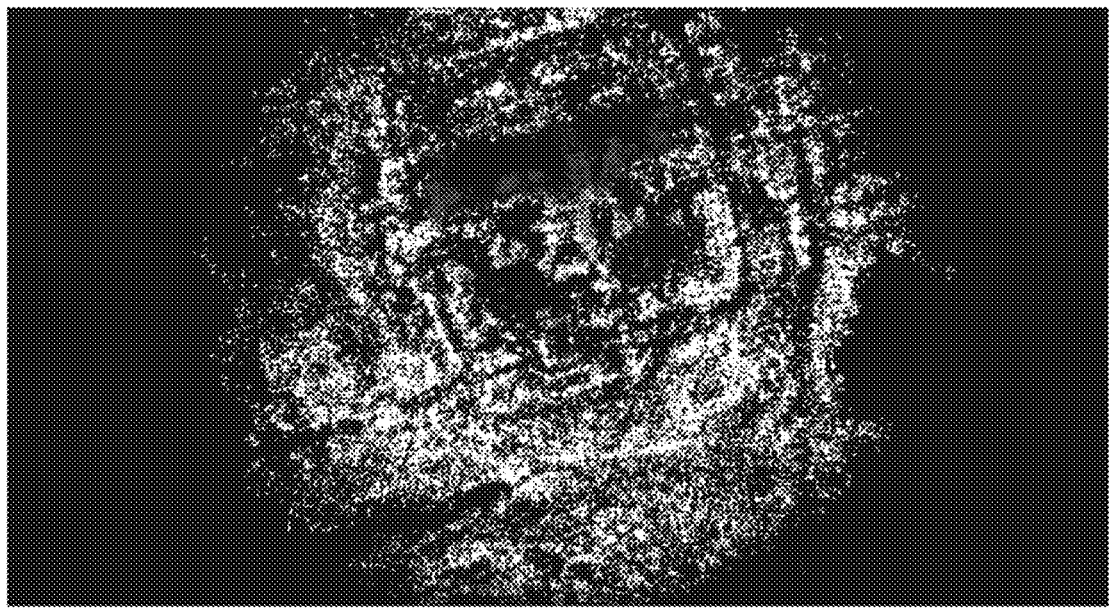
FIG. 7 shows sparse HSI reconstruction with a gray-scale version of a false-color map corresponding to elevation applied. These elevation values are the source for generating digital elevation maps (DEMs).

In addition to exploiting the spectral content of the scene, traditional 3D analysis can also be performed on the reconstruction. With aerial data, a common request for output is a digital elevation map (DEM) of the scene. Exemplary hyperspectral SFM methods can output a DEM of the scene by flattening the z-coordinates of the global scene onto the x-y axis. These values are scaled and missing pixels are filled in with interpolation, producing an HSI-derived elevation map. An example of this can be seen in FIG. 7.

Initial analysis has shown that the contribution of using RXD features is highly dependent on the scene content being studied. The industrial complex data set, for example, contained enough different materials present with spectral variation that the anomaly detector was able to identify and use these points to build RXD feature tracks which established baseline camera estimates. A secondary HSI data set we have studied is of a country estate, where the scene is of a large white house surrounded mainly by trees and grass. This scene lacks spectrally anomalous features, and therefore it was difficult to leverage the RXD algorithm to build camera estimates from. In such a case, one may rely solely on the RGB and single-band image feature points to extract camera pose information. An initial step of an exemplary method, therefore, might include a determination of whether or not to use hyperspectral information. Another approach that could remove this dependence on scene content would be to place spectral targets/markers throughout the scene being imaged. Anomaly detection or matched filter detection could easily identify and match these targets from view to view, automatically creating a set of baseline feature correspondences to build feature tracks on.

Exemplary 3D reconstruction methods for processing hyperspectral imagery can be exploited for a variety of spectral analysis techniques. Hyperspectral data can be translated into an intuitive, three-dimensional environment which can be generated with a single pass or orbit of an aerially-based HSI sensor. This domain provides new visualization techniques for a variety HSI analysis tools, including content-based surveying, digital elevation mapping, and matched-filter target detection, adding a level of intuitiveness not found in standard 2D image processing. An example reconstruction generated from 26 individual hyperspectral images as the sensor orbited an industrial complex was provided. Merging traditional SFM techniques with the spectral content of the data proved successful, as the SFM pipeline converged on accurate camera parameters for our system, with correct camera position and intrinsic values determined solely from pixel movement between views. Anomaly detection results were integrated into the pipeline, but their contribution was shown to depend heavily on the type of scene being imaged.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for determining structure from motion in hyperspectral imaging, the method including the steps of:
    acquiring a sequence of hyperspectral data cubes taken by an imaging device, each hyperspectral data cube containing intensity data, the intensity data being stored in dimensions of the hyperspectral data cube including a first spatial dimension, a second spatial dimension, and a spectrum dimension;
    establishing a set of baseline spectral features from a data cube for tracking between data cubes;
    establishing a set of standard features from a data cube for tracking between data cubes;
    matching, between data cubes, respective baseline features and standard features;
    extracting imaging device motion information based on relative positions of matched baseline and standard features;
    determining a baseline pair of data cubes;
    determining positions of respective baseline and standard features relative to the imaging device based on triangulation of imaging device motion between the baseline pair of data cubes;
    iteratively building a sparse structural reconstruction of the scene with a 3D point cloud of features by adding positions of baseline and standard features from additional data cubes.

2. The method of claim 1, wherein the step of establishing a set of baseline features includes detecting anomalies in the intensity data by measuring spectral differences between spatial regions of the data cube.

3. The method of claim 2, wherein detecting anomalies in the intensity data includes performing a Reed-Xiaoli Detector (RXD) algorithm on each data cube, and comparing the output of the RXD algorithm to a predetermined threshold to select a subset of most spectrally unique points in the data cube.

4. The method of claim 1, wherein the step of establishing a set of standard features includes:
    flattening each data cube into a false-color RGB representation;
    performing on the false-color RGB representation and on three monochromatic images from the data cube a feature detection and extraction routine to determine the set of standard features.

5. The method of claim 4, wherein flattening each data cube includes selecting three individual bands to represent each of three RGB channels.

6. The method of claim 4, wherein flattening each data cube includes averaging over a range of bands to generate each of three RGB channels.

7. The method of claim 1, wherein the step of matching includes using both a brute-force feature matcher routine with additional spectral verification, providing a two-factor verification that reduces mismatched features between data cubes.

8. The method of claim 1, wherein the step of matching includes matching baseline spectral features using a nearest-neighbor routine and computing spectral similarity of the baseline features via a cosine similarity measure.

9. The method of claim 1, further comprising the step of:
building a set of feature tracks that each follow a respective baseline feature across several data cubes in the sequence of data cubes.

10. The method of claim 9, wherein the step of extracting imaging device motion includes relating motion of the feature tracks across data cubes to motion of the imaging device.

11. The method of claim 1, wherein the step of determining a base pair of data cubes comprises:
stepping through each pair of data cubes and determining which pair has the highest percentage of accurately-projected features.

12. The method of claim 11, wherein the step of determining a baseline pair of data cubes includes measuring accuracy based on percentage of points with positive z-axis projections relative to a focal plane of the imaging device combined with average error of projected features as the projected features are reprojected back onto the data cubes.

* * * * *